(12) United States Patent
Hamilton et al.

(10) Patent No.: US 7,206,855 B1
(45) Date of Patent: Apr. 17, 2007

(54) SYSTEM AND METHOD FOR EXCHANGING INFORMATION ACROSS A COMPUTER NETWORK AT VARIABLE TRANSMISSION RATES

(75) Inventors: Keith S. Hamilton, Sammamish, WA (US); Antero T. Koskinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

(21) Appl. No.: 10/187,029

(22) Filed: Jun. 28, 2002

(51) Int. Cl.
*G06F 15/16* (2006.01)

(52) U.S. Cl. .................. 709/232; 709/203; 709/223; 709/224; 709/233; 709/234; 370/232; 370/233; 370/234

(58) Field of Classification Search ........ 709/232–235, 709/203, 223–224, 226; 370/232–234
See application file for complete search history.

(56) References Cited

U.S. PATENT DOCUMENTS

| | | | |
|---|---|---|---|
| 5,367,523 A * | 11/1994 | Chang et al. ............... 370/235 |
| 6,622,172 B1 * | 9/2003 | Tam .......................... 709/232 |
| 6,658,485 B1 * | 12/2003 | Baber et al. ................ 719/314 |
| 6,701,372 B2 * | 3/2004 | Yano et al. .................. 709/232 |
| 2002/0071388 A1 * | 6/2002 | Bergsson et al. ........... 370/230 |

* cited by examiner

*Primary Examiner*—Saleh Najjar
*Assistant Examiner*—Shawki S. Ismail
(74) *Attorney, Agent, or Firm*—Joseph R. Kelly; Westman, Champlin & Kelly, P.A.

(57) ABSTRACT

A send client can send a message comprising multiple message segments to a receive client via a computer network. A data exchange server can receive the message segments sent by the send client and store these message segments in a storage device. The data exchange server can also send the message (once all the message segments are received) to a receive client. For each message segment to be sent to the receive client, the data exchange server can calculate a transmission rate for the message segment based upon current network throughput and send the message segment to the receive client at the calculated transmission rate.

13 Claims, 12 Drawing Sheets

Pull Message Process

SYSTEM AND METHOD FOR EXCHANGING INFORMATION ACROSS A COMPUTER NETWORK AT VARIABLE TRANSMISSION RATES

TECHNICAL FIELD

The present invention is generally directed to the exchange of information over a computer network. More particularly described, the present invention supports the efficient use of network bandwidth and resources in the exchange of information among businesses operating in heterogeneous computing environments.

BACKGROUND OF THE INVENTION

Over the years, as businesses have adopted computer-based systems and networks to assist in performing business-related functions and operations, they have looked for ways to exchange business information with other businesses reliably and securely. In the conventional art, businesses typically use Electronic Data Interchange (EDI), a standard format for exchanging business information. Additionally, they typically hire a value-added network (VAN), a private network provider, to facilitate in the exchange of EDI information between businesses over a proprietary network. VANs use a variety of network protocols, such as Point-to-Point Protocol (PPP), frame relay, Synchronous Data Link Control (SDLC), and Systems Network Architecture (SNA), to facilitate the exchange of the EDI business information.

However, the minimum monthly fees and per-character charges incurred by businesses using a VAN can be expensive, particularly when the businesses must exchange large amounts of information. For example, it is not uncommon for businesses to exchange greater than twenty Megabytes of information and even product catalogs that are greater than two Gigabytes in size. Consequently, there is a need in the art for a cost-efficient and reliable means of exchanging a large amount of business information over a non-proprietary medium, such as the World Wide Web. Additionally, there is a need in the art for a reliable means of exchanging large amounts of information without overloading network bandwidth and resources. Last, there is a need in the art for a means of exchanging business information without underutilizing network bandwidth and resources.

SUMMARY OF THE INVENTION

The present invention can solve the aforementioned problems by providing a system and method of exchanging information at transmission rates that take into account current network throughput. In other words, a transmission rate can be calculated based upon current network use and the availability of network resources. The information can then be exchanged at the calculated transmission rate.

In one aspect of the present invention, a send client can send a message comprising multiple message segments via a computer network to a receive client. A data exchange server can receive each message segment of the message from the send client over the computer network and store the message segments in a storage device. The data exchange server can also send the message segments of the message to the receive client. For each message segment to be sent by the data exchange server to the receive client, the data exchange server can calculate a transmission rate based upon current network throughput and send the message segment at the calculated transmission rate to the receive client.

In another aspect of the present invention, a send client can send a message directly to a receive client, without the message first being processed by the RDE server. Specifically, because the RDE server and the receive client can implement the same interface, the receive client can receive the message from the send client in the same way as an RDE server would receive the message. Thus, for each message segment to be sent by the send client to the receive client, the send client can calculate a transmission rate based upon current network throughput and send the message segment at the calculated transmission rate to the receive client.

In yet another aspect of the present invention, a data exchange server can send a message comprising multiple message segments via a computer network to a receive client or to a second data exchange server. Thus, for each message segment to be sent by the data exchange server to the receive client or to the second data exchange server, the data exchange server can calculate a transmission rate based upon current network throughput and send the message segment at the calculated transmission rate to the receive client or the second data exchange server.

In another aspect of the present invention, a retrieve client can request to retrieve a message from a data exchange server. In making this request, for each message segment of a message, the retrieve client can calculate a transmission rate based upon current network throughput and use the calculated transmission rate to retrieve the message segment.

Various aspects of the present invention may be more clearly understood and appreciated from a review of the following detailed description of the disclosed embodiments and by reference to the drawings and claims.

DETAILED DESCRIPTION OF EXEMPLARY EMBODIMENTS

Figure 1:
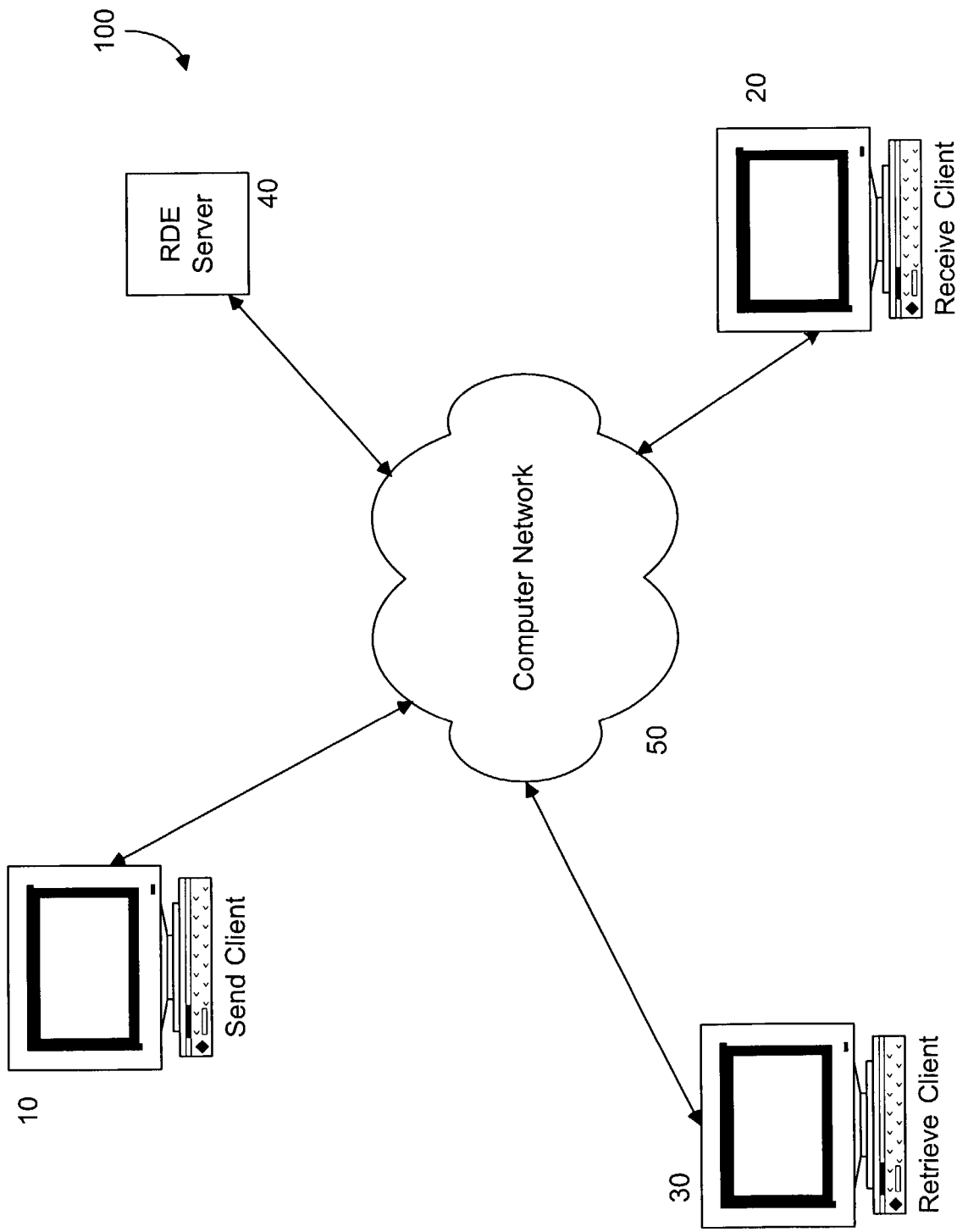
FIG. 1 illustrates some components of an exemplary system for exchanging messages across a computer network between a send client and a receive client.

Illustrative embodiments of the present invention will be described below. Although the illustrative embodiments will be generally described in the context of computers exchanging information over computer networks, those skilled in the art will recognize that the present invention may be implemented for any application in which information is exchanged via a communication medium.

An exemplary embodiment of the present invention, which can be embodied in one or more program modules that run in a distributed computing environment, can allow a send client to create and send one or more messages to a receive client via a communication medium, such as a computer network. When a send client sends a message, the message travels via the communication medium to a reliable data exchange server (the "RDE server"). An exemplary RDE server receives the message via the computer network and stores the message in a database. If the message is to be sent to one or more receive clients, the RDE server processes and sends the message to the receive clients. The exemplary system can also comprise a retrieve client. An exemplary retrieve client can request to retrieve a message via the communication medium that has been previously sent by a send client to the retrieve client.

In another exemplary embodiment of the present invention, a send client sends a message directly to a receive client, without the message first being processed by the RDE server. Specifically, because the RDE server and the receive client implement the same interface, the receive client receives the message from the send client in the same way as an RDE server receives the message. Thus, for each message segment to be sent by the send client to the receive client, the send client calculates a transmission rate based upon current network throughput and send the message segment at the calculated transmission rate to the receive client.

In yet another embodiment of the present invention, a data exchange server sends a message comprising multiple message segments via a computer network to a receive client or to a second data exchange server. Thus, for each message segment to be sent by the data exchange server to the receive client or to the second data exchange server, the data exchange server calculates a transmission rate based upon current network throughput and sends the message segment at the calculated transmission rate to the receive client or the second data exchange server.

Referring now to the drawings in which like numerals represent like elements throughout the several figures, exemplary embodiments of the present invention and the illustrative operating environment will be described in connection with the drawings.

FIG. 1 illustrates some components of an exemplary system 100 for exchanging messages across a computer network 50 between a send client 10 and a receive client 20. Though only individual components are illustrated in the exemplary embodiment of FIG. 1, multiple components can be employed without departing from the scope and spirit of the present invention.

The system 100 comprises a send client 10, which creates and sends a message to one or more exemplary receive clients 20 via a communication medium, such as a computer network 50. The system 100 can also comprise a retrieve client 30. An exemplary retrieve client 30 retrieves a message via the computer network 50 that has been previously sent by a send client 10 to the retrieve client 30.

A send client 10 uses one or more industry standard protocols to send a message via the computer network 50. For example, in one exemplary embodiment, send clients 10 and receive clients 20 can use Simple Object Access Protocol, or SOAP, to exchange information. As is understood by those skilled in the art, SOAP uses Hypertext Transfer Protocol (HTTP) and Extensible Markup Language (XML) to facilitate the information exchange. Since HTTP requests are usually allowed through firewalls, programs using SOAP to communicate are able to communicate with programs anywhere.

The system 100 supports a secure environment in which businesses can communicate and exchange information. In one exemplary embodiment, the system 100 authenticates SOAP calls that are initiated by a send client 10 to a receive client 20 using a user id and password. In this way, the receive client 20 always knows who is initiating the call.

The system 100 also supports the use of digital signatures on messages. As is understood by those skilled in the art, digital signatures also ensure the authentication and integrity of a message. With the use of a public key, the system 100 is able to determine whether a message is authentic based upon the signature on the message. By using a user id and password and the digital signature, the system 100 can then ensure that the send client 10 is authorized to exchange information with the receive client 20, and that the receive client 30 is authorized to exchange information with the send client 20.

For added security, send clients 10 and receive clients 20 can encrypt the messages that they exchange. In one exemplary embodiment, the send client 10 can encrypt the message, and the receive client 20 can decrypt the message using a public key. In another exemplary embodiment, the send client 10 and the receive client 20 can encrypt the message using Hypertext Transfer Protocol over Secure Socket Layer (HTTPS).

In another exemplary embodiment, send clients 10 can ensure the integrity of a message being sent via the computer network 50 by 64-bit encoding the message and using a check sum to ensure that the message has not been modified. Additionally, digital signatures also ensure that the message has not been modified.

When a send client 10 sends a message, the message travels via the computer network 50 to a reliable data exchange server 40 (the "RDE server" 40). An exemplary RDE server 40 receives the message via the computer network 50 and stores the message in a database. The RDE server 40 also stores the message header information (or "metadata") in a database. If the send client 10 has sent the message to one or more receive clients 20, the RDE server 40 processes and sends the message to a next destination. The next destination can comprise a receive client 20 or another RDE server 40.

RDE servers 40 can be daisy-chained together. Thus, when a send client 10 sends a message via the computer network 50, the message can be routed from one RDE server 40 to another RDE server 40 until it reaches its final destination. An infinite number of RDE servers 40 can be daisy-chained together. In this way, an RDE server 40 may send the message directly to a receive client 20 or to another RDE server 40. Similarly, an RDE server 40 may receive a message from a send client 10 or from another RDE server 40.

When a send client 10 sends messages via the computer network 50, it can require that those messages be maintained in the order in which they are initially received by an RDE server 40. For example, assume one business (the send client 10) is sending a first message to another business (the receive client 20). This first message comprises a purchase order to purchase products A, B, and C. At a later time, the send client 10 sends a second message to increase the quantity ordered of products A and B. The send client 10 then sends a third message decreasing the quantity of product C ordered. Finally, the send client 10 sends a fourth message canceling its order for product A. In order to ensure that the receive client 20 understands the changes made to the purchase order in the order in which the changes were made, the send client 10 can require the RDE server 40 to maintain the messages in the order in which the RDE server 40 receives them. Thus, in this example, the RDE server 40 would maintain the messages in the following order: first message, second message, third message, and fourth message. Additionally, the RDE server 40 will send the messages to the next destination (such as a receive client 20 or another RDE server 40) in the order in which it received the messages. If the next destination sends the messages on to another destination, it will also maintain the order in which the first RDE server 40 received the messages.

A send client 10 can require that a particular group of messages be maintained in a particular order by functionally grouping the messages into an ordered set. The send client 10 associates each message of the ordered set with an ordered set identifier. The ordered set identifier uniquely identifies the ordered set. As the RDE server 40 receives each message associated with an ordered set identifier, it associates a sequence number with the message. The sequence number identifies the order in which the RDE server 40 received the message.

Additionally, the exemplary system 100 supports message multiplexing. More specifically, one or more send clients 10 can send a message in smaller segments. By multiplexing, a send client 10 can preserve network bandwidth and network resources and increase throughput. In this way, large messages can easily be accommodated over a computer network 50 with limited bandwidth. In one exemplary embodiment, a send client 10 can split a message into smaller segments and send the segments at different times or in parallel, and in any order. In another exemplary embodiment, multiple send clients 10 can send the segments. The send clients 10 can send these message segments at different times or in parallel, and in any order. Prior to sending a message segment to the receive clients 20, the RDE server 40 determines whether the computer network 40 is currently being over-utilized (and therefore throughput has diminished) or under-utilized (and therefore throughput has increased). Depending upon the network's throughput, the RDE server 40 calculates a transmission rate that takes into account the network's current use and sends the message at the calculated transmission rate.

An RDE server 40 can receive the segments of a multiplexed message in any order. Upon receiving the segments, the RDE server 40 organizes the segments in order to recreate the original message, regardless of when the segments are received and from whom they are received.

In another exemplary embodiment, multiple RDE servers 40 can receive the multiplexed message from one or more send clients 10. In this embodiment, the receive clients 20 receive the message segments, as described above, and coordinate with each other in order to organize the message segments to recreate the message.

Upon sending a message, a send client 10 can request confirmation from the RDE server 40 that the message has been successfully received by the RDE server 40 (a "receive receipt"), or that it has been successfully sent by the RDE server 40 to a next destination (a "send receipt"). An exemplary receipt comprises an XML document that contains information about when the message was successfully sent and received, and the digital signatures and digital certificates associated with the message. A send client 10 can use receipts to track the transmission of the message across the computer network 50. As described above, the next destination of a message may comprise a receive client 20 or another RDE server 40.

In this way, if a send client 10 requests a receive receipt for a particular message, upon successfully receiving the message, the RDE server 40 will send a receive receipt to the send client 10. If a send client 10 requests a send receipt from the RDE server 40 for a particular message, upon successfully sending the message to the next destination, the RDE server 40 will send a send receipt to the send client 10. In another exemplary embodiment, if multiple RDE servers 40 are daisy-chained together, then each RDE server 40 generates and sends the requested receipts upon the successful send or receipt of the message.

If the send client 10 has requested a send receipt for a message and that message is retrieved from the RDE server 40 by a retrieve client 30, the RDE server 40 sends the send client 10 the send receipt once the retrieve client 30 has successfully retrieved the message.

The system 100 supports the ability of a send client 10 to send a message to a physical address, such as a Uniform Resource Locator (URL). In one exemplary embodiment, the send client 10 sends a message to a destination name, and the RDE server 40 resolves the name to a physical address. In another exemplary embodiment, the send client 10 sends a message to a mailbox located at the physical address.

Figure 2:
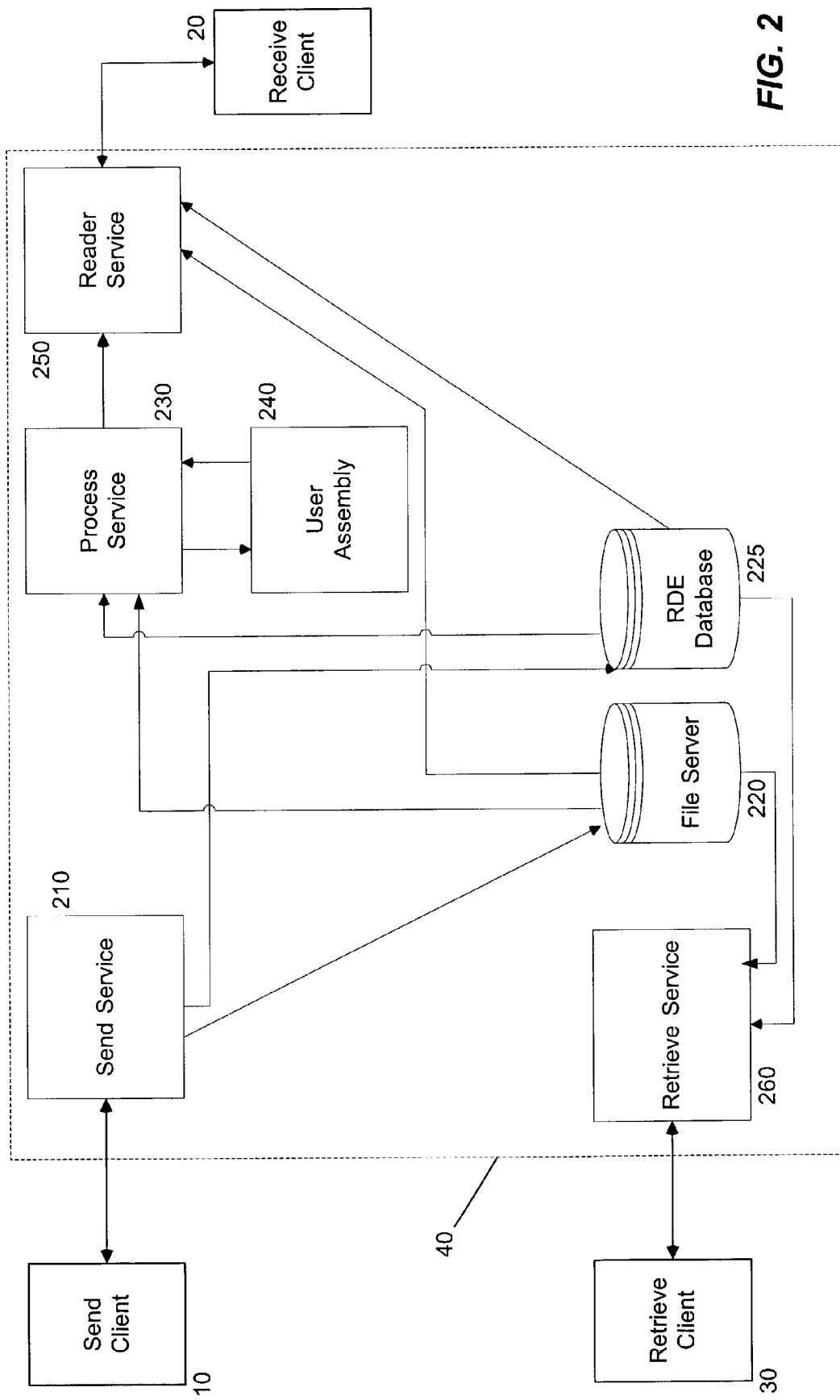
FIG. 2 illustrates an exemplary reliable data exchange (RDE) server.

FIG. 2 illustrates an exemplary RDE server 40. Though only individual components are illustrated in the exemplary embodiment of FIG. 2, multiple components can be employed without departing from the scope and the spirit of the present invention.

The RDE server 40 can comprise a send service 210. The send service 210 receives the messages sent by a send client 10 via the computer network 50. Upon receiving a message, the send service 210 stores the message in a file server 220 and stores the header information of the message in a reliable data exchange database 225 (the "database" 225). Once the send service 210 stores the header information in the database 225, the database 225 notifies an exemplary process service 230 to process the message. If the message needs to be translated into another format, the process service 230 sends the message to the user assembly 240. The user assembly 240 transforms the message into a new format and sends the newly reformatted message back to the process service 230. The process service 230 then stores the reformatted message in the file server 220 and the header information of the message in the database 225.

If the RDE server 40 is to send the entire message on to one or more receive clients 20, the reader service 250 retrieves the message from the file server 220 and the header information from the database 225. Upon retrieving the message and header information, the reader service 250 then sends the message and the header information to the receive clients 20 (or to another RDE server 40) via the computer network 50.

On the other hand, if the RDE server 40 is to send the message on as a multiplexed message, for each message segment of the message, the reader service 250 retrieves the message segment from the file server 220 and the header information from the database 225. Upon retrieving the message segment and header information, the reader service 250 evaluates the current use and throughput of the computer network 50. The reader service 250 calculates a transmission rate at which it can make the best use of the network's bandwidth and resources, and then sends the message segment at the calculated transmission rate to one or more receive clients 10 or another RDE server 40.

The RDE server 40 can also comprise a retrieve service 260. The retrieve service 260 can receive requests from a retrieve client 30 to retrieve one or more messages previously sent by a send client 20. Thus, rather than requesting the send client 20 to re-send the message, the retrieve client 30 can retrieve the message directly from the RDE server 40. Upon receiving such a request, the retrieve service 260 retrieves the message from the file server 220 and the message header information from the database 225. The retrieve service 260 then sends the message to the retrieve client 30. If the retrieve client 30 wants to retrieve a segmented message from the RDE server 40, then the retrieve client 30 calculates a transmission rate in accordance with current network use and throughput and requests to retrieve the message segment at the calculated transmission rate. Upon receiving this request, the retrieve service 260 sends the requested message segments to the retrieve client 30 at the calculated transmission rate.

Figure 3:
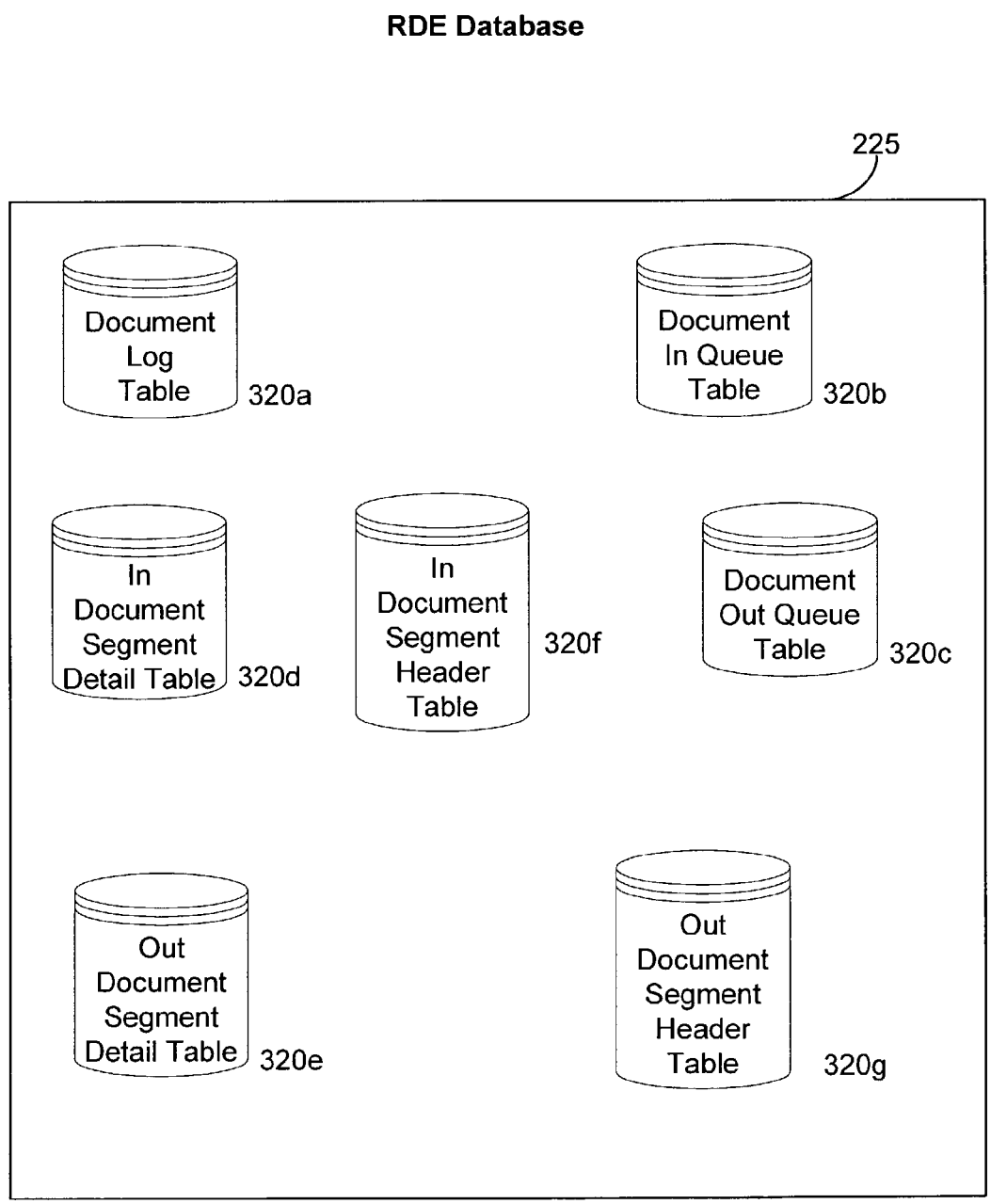
FIG. 3 illustrates an exemplary RDE database.

FIG. 3 illustrates an exemplary reliable data exchange database 225. The database 225 comprises one or more tables that store different types of information. The RDE server 40 uses these tables in processing a message. In one exemplary embodiment of the present invention, the database 225 comprises a document log table 320a, a document in queue table 320b, a document out queue table 320c, an in document segment detail table 320d, an out document segment detail table 320e, an in document segment header table 320f, and an out document segment header table 320g.

Upon receiving a message from a send client 10, the RDE server 40 stores the header information of the message in the document log table 320a. The header information of a message can comprise a send client identifier, which identifies the send client 10 that sent the message; a receive client identifier, which identifies the receive client 20 to which the message is sent; a mailbox identifier, if the message is to be sent to a particular mailbox; a message identifier that uniquely identifies the message; the message size; a listing of receipts requested by the send client 10; an ordered set identifier, if the message belongs to an ordered set; an expiration date, which identifies a date by which the message must be sent to its destination or retrieved; and a property bag. The property bag allows a message header to be extensible because it is part of the header information. Thus, if a send client 10 wants to send additional header information along with the message for use by the receive client 20, the send client 10 can place this information in the property bag, and the receive client 20 can retrieve this additional header information from the property bag.

The document log table 220a keeps a master copy of all the messages received by the RDE server 40. Upon receiving the message, the RDE server 40 stores the header information of the message in the document in queue table 320b for further processing. Thus, messages that are stored in the document in queue table 320b are processed and eventually sent on to a next destination by the RDE server 40. After processing a message that is stored in the document in queue table 320b, the process service 230 of the RDE server 40 moves the message to the document out queue table 320c. The document out queue table 320c identifies those messages to be sent (or "pushed") to a next destination. For example, the message may be pushed to one or more receive clients 20 or to another RDE server 40. The document out queue table 320c also identifies those documents to be retrieved (or "pulled") by a retrieve client 30.

When the RDE server 40 receives a segment of a multiplexed message, it stores detail information about the segment in the in document segment detail table 320d. Exemplary detail information comprises a segment identifier, which uniquely identifies the segment, the segment offset, and the segment size. The RDE server 40 uses this detail information to recreate the message from the received segments. The RDE server 40 uses the in document segment header table 320f to store the header information of the segments until all the segments of a message are received. Once all of the segments of a message are received by the RDE server 40, the RDE server 40 moves the header information from the document segment header table 320f to the document log table 320a and the document in queue table 320b. The RDE server 40 deletes the detail information from the in document segment detail table 320d once all of the segments are written to the document log table 320a. Additionally, the RDE server 40 uses the out document segment header table 320g to store the header information of a message while it is being sent by the RDE server 40 to a receive client 20 or to another RDE server 40.

Certain steps in the processes described below in FIG. 4 through FIG. 10 must naturally precede others for the present invention to function as described. However, the present invention is not limited to the order of the steps described, if such order or sequence does not alter the functionality of the present invention. It is recognized that some steps may be performed before or after other steps without departing from the scope and the spirit of the present invention.

Figure 4:
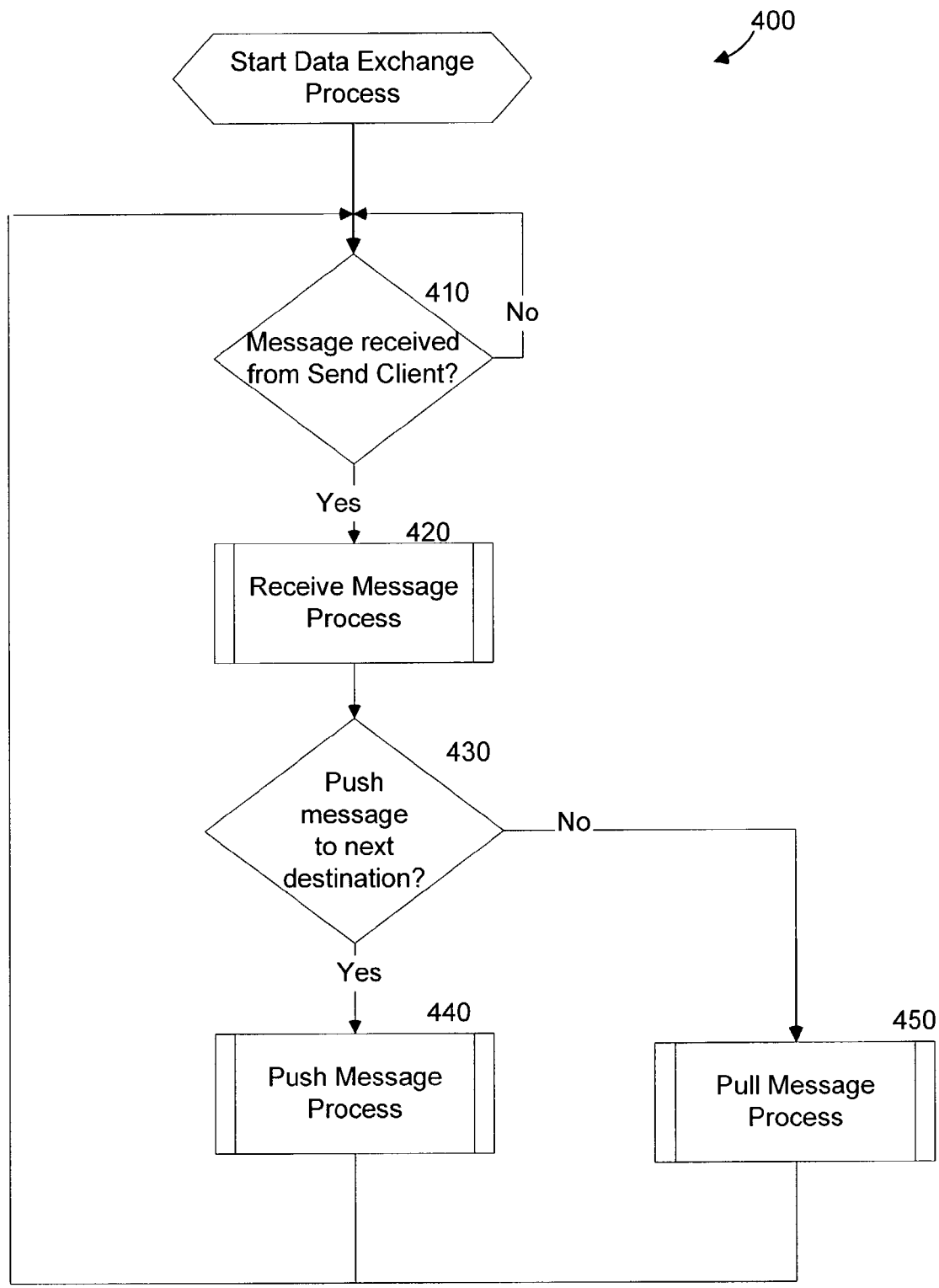
FIG. 4 is a logic flow diagram illustrating an exemplary process for exchanging messages via a computer network between send clients and receive clients.

FIG. 4 is a logic flow diagram illustrating an exemplary process 400 for exchanging messages via a computer network 50 between send clients 10 and receive clients 20. Step 410 is the first step in the exemplary process 400 for exchanging messages. In Step 410, the RDE server 40 determines whether it has received a message from a send client 10 (or another RDE server 40). If the RDE server 40 has received a message from the send client 10 or RDE server 40, then in Step 420, the RDE server 40 receives and processes the message. In Step 430, the RDE server 40 determines whether the message received from the send client 10 should be sent (or "pushed") to one or more receive clients 20 (or to another RDE server 40). If the RDE server 40 is to send the message to a next destination, then in Step 440, the RDE server 40 pushes the message. If the message does not need to be pushed to a next destination, then the RDE server 40 begins the pull message process.

Figure 5A:
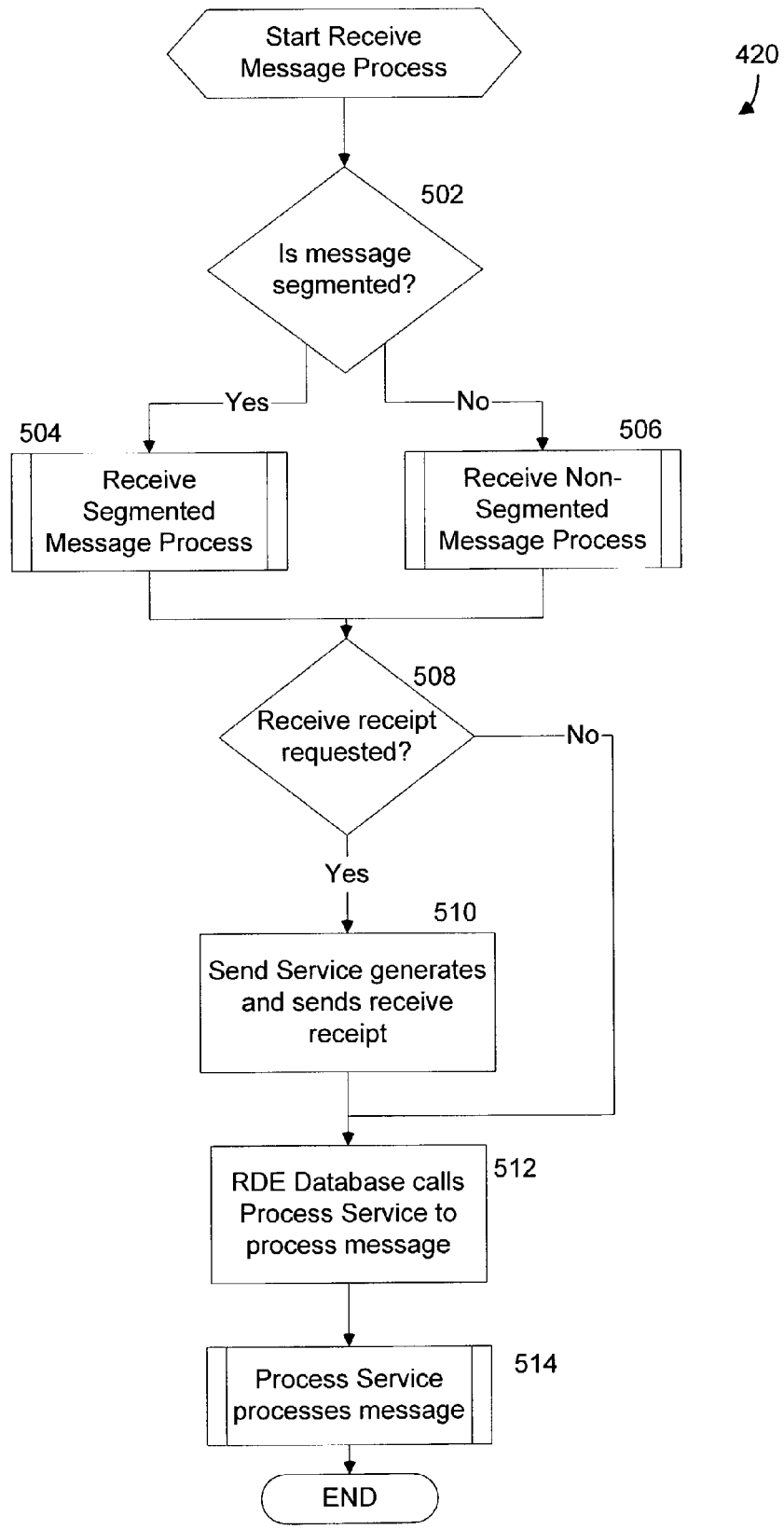
FIG. 5a is a logic flow diagram illustrating an exemplary sub-process or routine of FIG. 4 for receiving a message from a send client or RDE server via the computer network.

FIG. 5a is a logic flow diagram illustrating an exemplary sub-process or routine 420 of FIG. 4 for receiving a message from a send client 10 or RDE server 40 via the computer network 50. Step 502 is the first step in the exemplary process 420 for receiving the message. In Step 502, the send service 210 of the RDE server 40 determines whether the message received comprises a segment of a multiplexed message. In other words, the RDE server 40 determines whether one or more send clients 10 have sent a message segment (as opposed to the entire message). If the RDE server 40 has received a message segment, then in Step 504, the send service 210 receives the message segment. If the RDE server 40 has not received a message segment (but rather the entire message at once), then in Step 506, the send service 210 receives the non-segmented message. In Step 508, the send service 210 determines whether the send client 10 (who initially created and sent the message) has requested a receive receipt. If the send client 10 has requested a receive receipt, then in Step 510, the send service 210 generates and sends the receive receipt to the send client 10. In Step 512, the reliable data exchange database 225 calls the process service 230 to process the message. In Step 514, the process service 230 processes the message.

Figure 5B:
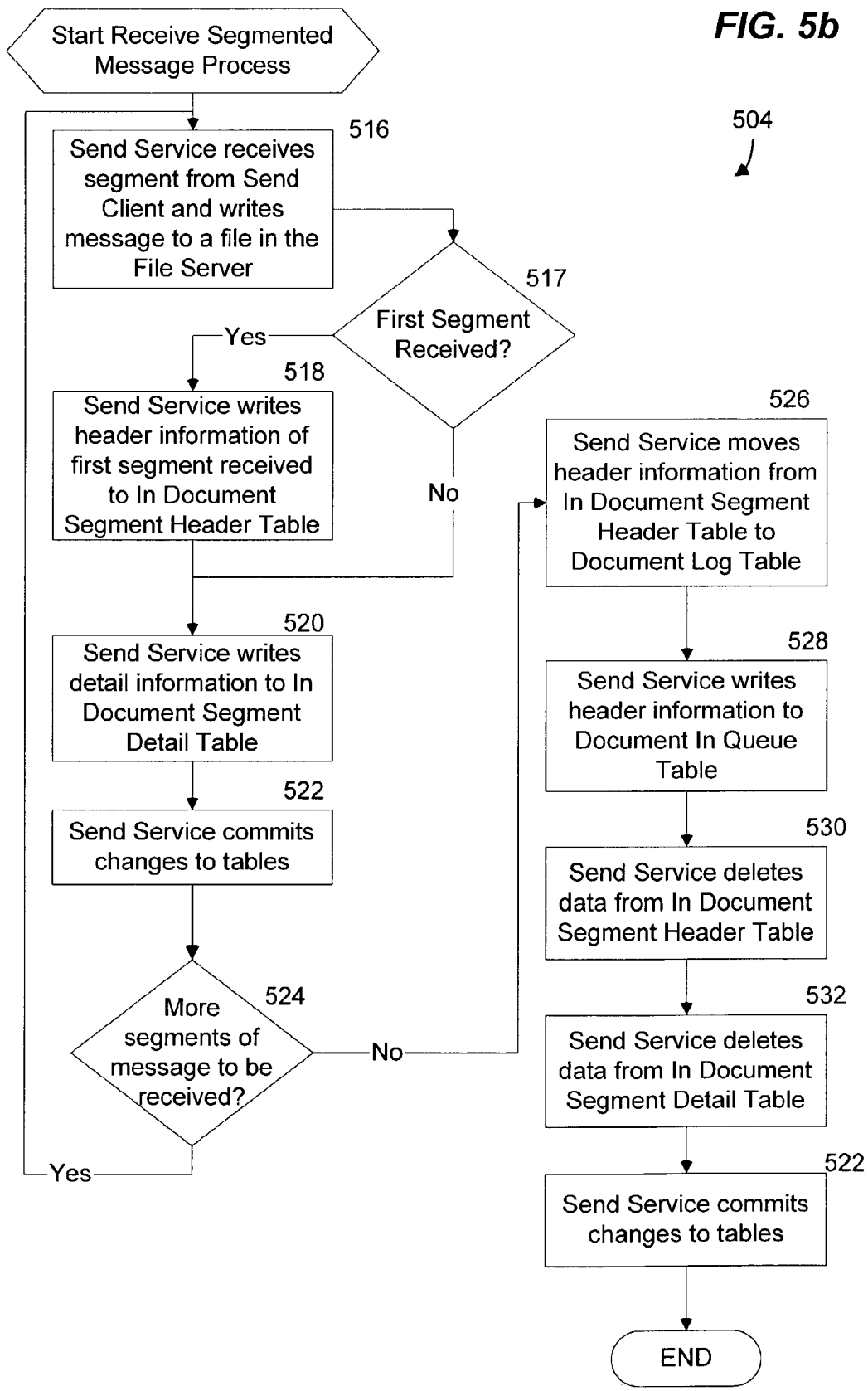
FIG. 5b is a logic flow diagram illustrating an exemplary sub-process or routine of FIG. 5a for receiving a segmented message from one or more send clients (or from another RDE server) at the send service.

FIG. 5b is a logic flow diagram illustrating an exemplary sub-process or routine 504 of FIG. 5a for receiving a segmented message from one or more send clients 10 (or from another RDE server 40) at the send service 210. Step 516 is the first step in the exemplary sub-process 504 for receiving the segmented message. In Step 516, the send service 210 receives a message segment from a send client 10 (or another RDE server 40) and writes the message segment to a file in the file server 220. In Step 517, if the message segment is the first message segment received, then the process branches to Step 518. In Step 518, the send service 210 writes the header information of the message segment to the in document segment header table 320f. If in Step 517, the message segment is not the first message segment received, or once the send service 210 write the header information in Step 518, then in Step 520, the send service 210 writes detail information to the in document segment detail table 320d. In Step 522, the send service 210 commits the changes to the tables.

In Step 524, the send service 210 determines if all the segments of the multiplexed message have been received from the send clients 10. Specifically, the send service 210 calculates whether all of the segments of a message have been received. In one exemplary embodiment, the send service 210 calculates whether all of the segments of a message have been received using the message size of the message and the segment size of each segment received. The segment size of each segment is stored in the in document segment detail table 320d as each segment is received at the RDE server 40. The RDE server 40 knows the size of the actual message from an argument of a send client's method call to create the message.

In Step 524, if more segments are to be received at the RDE server 40, then the process branches to Step 516. However, if all the message segments have been received by the RDE server 40, then in Step 526, the send service 210 moves the message header information from the in document segment header table 320f to the document log table 320a. In Step 528, the send service 210 writes the header information to the document in queue table 320b. In Step 530, once the RDE server 40 has received all the segments of the message, the send service 210 deletes the header information of the segments from the in document segment header table 320f. Additionally, in Step 532, the send service 210 deletes the detail information of the segments from the in document segment detail table 320d. In Step 522, the send service 210 then commits the changes to the tables.

Figure 5C:
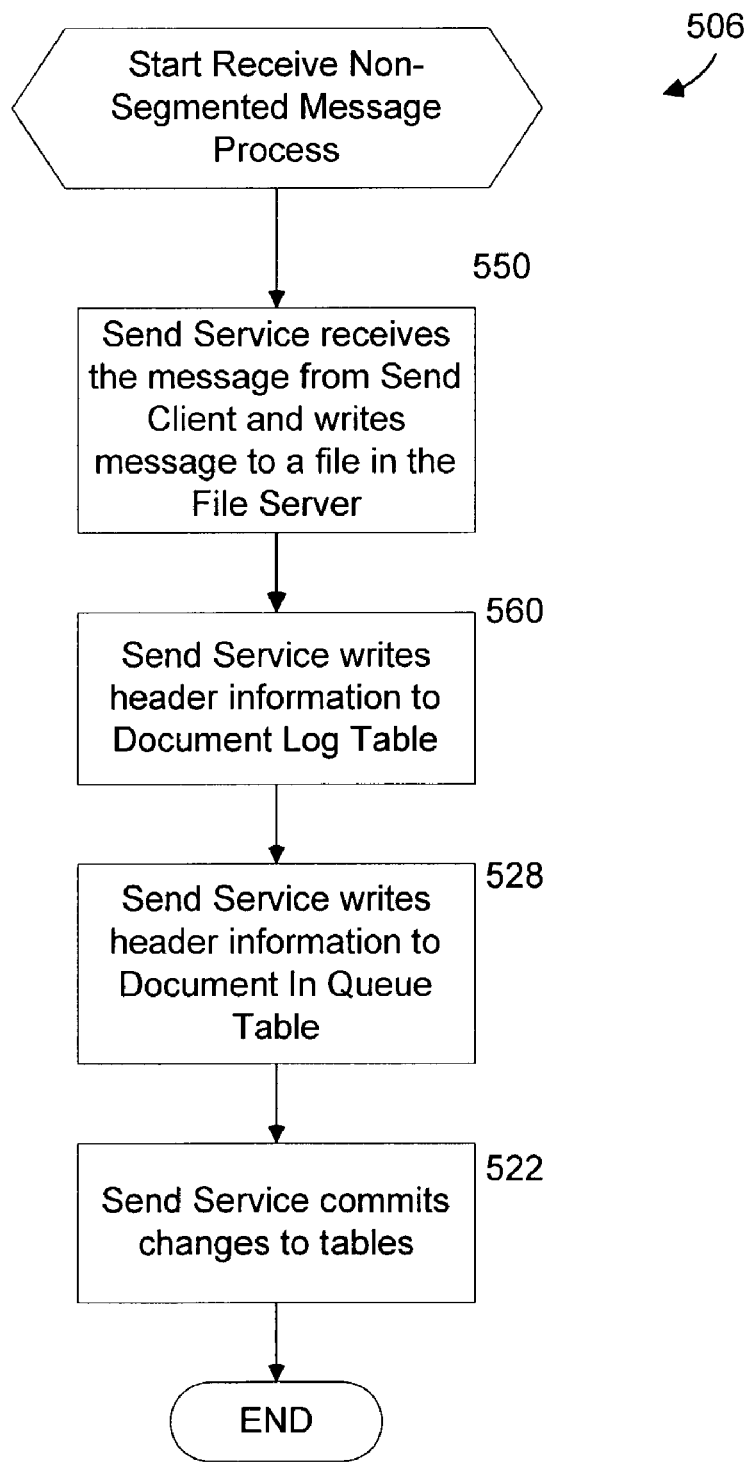
FIG. 5c is a logic flow diagram illustrating an exemplary sub-process or routine of FIG. 5a for receiving a non-segmented message via the computer network from a send client (or another RDE server).

FIG. 5c is a logic flow diagram illustrating an exemplary sub-process or routine 506 of FIG. 5a for receiving a non-segmented message via the computer network 50 from a send client 10 (or another RDE server 40). Step 550 is the first step in the exemplary sub-process 506. In Step 550, the send service 210 receives the message from the send client 10 (or from another RDE server 40) and writes the message to a file in the file server 220. In Step 560, the send service 210 writes the header information to the document log table 320a. In Step 528, the send service 210 writes the header information to the document in queue table 320b. In Step 522, the send service 210 commits the changes to the tables.

Figure 6:
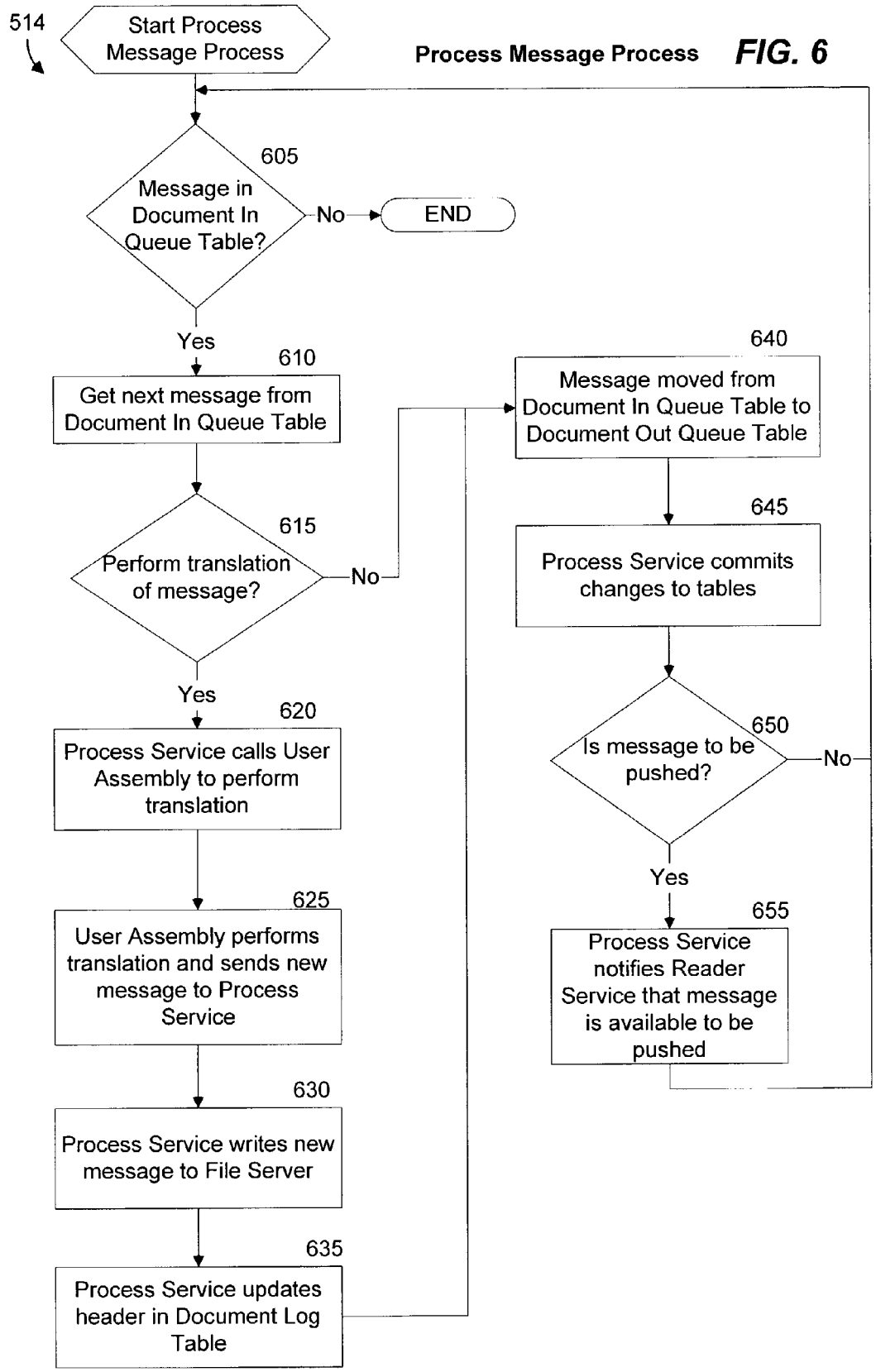
FIG. 6 is a logic flow diagram illustrating an exemplary sub-process or routine of FIG. 5a for processing a message received by the RDE server via the computer network.

FIG. 6 is a logic flow diagram illustrating an exemplary sub-process or routine 514 of FIG. 5a for processing a message received by the RDE server 40 via the computer network 50. Step 605 is the first step in the sub-process 514. In Step 605, the RDE server 40 determines whether a message is in the document in queue table 320b. If a message is not in the document in queue table 320b, then the process ends. However, if a message is in the document in queue table 320b, then in Step 610, the process service 230 retrieves the next message to be processed from the document in queue table 320b. In Step 615, the process service 230 determines whether translation should be performed on the message. A message can be translated from one format to another format in order to accommodate the computer platform or operating system of a receive client 20. For example, the RDE server 40 may translate the message from an EDI format to an XML format in order to accommodate the platform needs of the receive client 20. In this way, in one exemplary embodiment, the process service 230 can decide whether the user assembly 230 should translate a message based upon the receive client 20 to whom the message is being sent. In another exemplary embodiment, the process service 230 can decide whether the user assembly 230 should translate a message based upon the mailbox to which the message is being sent.

If translation is to be performed on the message, then in Step 620, the process service 230 calls the user assembly 240 to perform the translation. In Step 625, the user assembly 240 performs the translation and sends the newly translated message to the process service 230. Upon receiving the newly translated message from the user assembly 240, in Step 630, the process service 230 stores the translated message in the file server 220. In Step 635, the process service 230 also updates the header information in the document log table 320a.

In Step 615, if the process service 230 determines that the message does not need to be translated into another format, or once the process service 230 has updated the header information in the document log table 320a in Step 635, then in Step 640, the message is moved from the document in queue table 320b to the document out queue table 320c. In Step 645, the process service 230 then commits the changes to the tables in the database 225. In Step 650, the process service 230 determines whether the message is to be pushed to one or more receive clients 20 or to another RDE server 40. If the message is to be pushed, then in Step 655, the process service 230 notifies the reader service 250 that a message is available in the document out queue table 320c to be pushed.

In other exemplary embodiments of the present invention, the user assembly 230 can perform other types of processing of the message. For example, the user assembly 230 can process the message in order to keep track of the number of messages received by the RDE server 40. Similarly, in another exemplary embodiment, the user assembly 230 can process the message in order to keep track of other types of metric information. In other words, in other exemplary embodiments, the user assembly 230 can perform any type of processing on a per-message basis.

Figure 7:
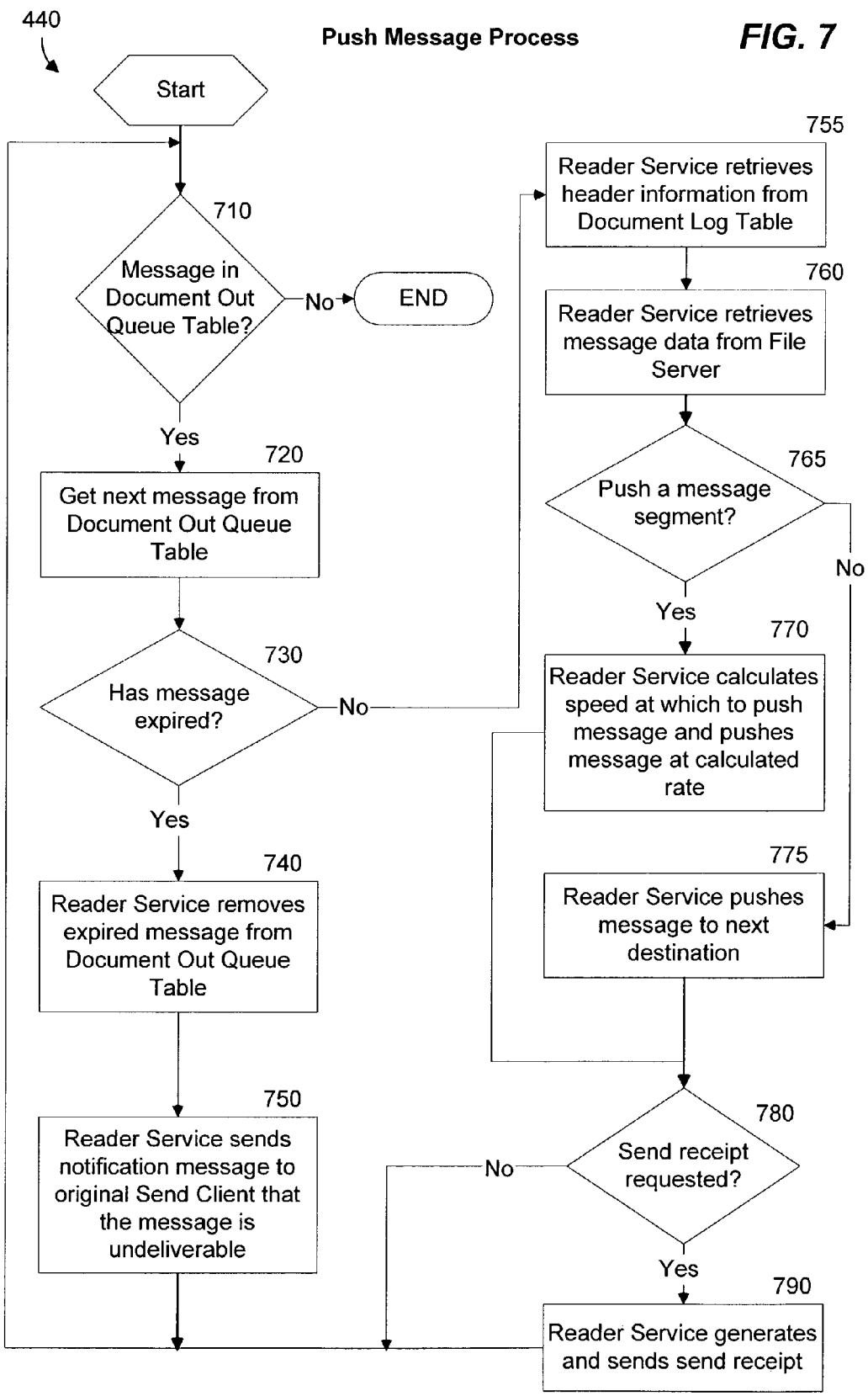
FIG. 7 is a logic flow diagram illustrating an exemplary sub-process or routine of FIG. 4 for pushing a message to a receive client or to an RDE server.

FIG. 7 is a logic flow diagram illustrating an exemplary sub-process or routine 440 of FIG. 4 for pushing a message to a receive client 20 or to an RDE server 40. Step 710 is the first step in the sub-process 440. In Step 710, the reader service 250 determines whether any messages exist in the document out queue table 320c. If a message exists in the document out queue table 320c, then in Step 720, the reader service 250 retrieves the next message from the document out queue table 320c. In Step 730, the reader service 250 determines whether the message has expired. More specifically, a send client 10 can associate a message with a date and/or time by which the message must be delivered to its next destination. If the message is not sent by that date and/or time, then the message has expired and may not be pushed by the RDE server 40 after that date and/or time. Therefore, in Step 730, the reader service 250 first determines if the message is associated with an expiration date. If the message is associated with an expiration date and the expiration date has passed, then the message has expired. If the message has expired, then in Step 740, the reader service 250 removes the expired message from the document out queue table 320c. In Step 750, the reader service 250 sends a notification message to the original send client 10 that the message will not be delivered because the time for delivery has expired.

However, in Step 730, if the message has not expired (or if the message is not associated with an expiration date and/or time), then in Step 755, the reader service 250 retrieves the header information of the message from the document log table 320a. In Step 760, the reader service 250 also retrieves the actual message from the file server 220.

In Step 765, the reader service 250 determines whether it will be sending (or "pushing") a message segment or an entire message. If the reader service 250 is pushing a message segment of a message, then in Step 770, the reader service 250 calls an SQL stored procedure to calculate the speed at which to push the message to its next destination. Specifically, the reader service 250 evaluates the current effective throughput of the computer network 50 based upon how long it has taken the reader service 250 to send previous message segments. If the computer network 50 is currently overloaded or congested, the reader service 250 calculates a lower transmission rate in order not to continue overloading the network. On the other hand, if the computer network 50 is currently under-utilized, the reader service 250 takes advantage of the available resources and calculates a higher transmission rate. In one exemplary embodiment of the present invention, the reader service 250 calculates a transmission rate using the following formula: Calculated Transmission Rate=Target Transmission Rate+(Actual Transmission Rate−Target Transmission Rate)*Weight. The Target Transmission Rate is the rate at which the RDE server 40 would like to send the message segment. The Actual Transmission Rate is the actual rate at which the RDE server 40 has been sending previous message segments. The Weight factor controls how quickly the RDE server 40 reacts to changes in network resources and network use. Therefore, if the network is currently under-utilized, then the reader service 250 selects a higher target transmission rate to be used in calculating a transmission rate to be used to send the segment. However, if the network is currently overloaded, then the reader service 250 selects a lower target transmission rate to be used in calculating a transmission rate. Then, the reader service 250 pushes the message segment to the next destination at the calculated transmission rate.

However, if in Step 765 the reader service 250 is pushing a message, then in step 775, the reader service 250 pushes the message to the next destination. After the reader service 250 pushes the message segment in Step 770 or the message in Step 775, in Step 780, the reader service 250 determines whether the original send client 10 requested a send receipt. If the send client 10 has requested a send receipt, then in Step 790, the reader service 250 generates and sends a send receipt to the send client 10 that confirms that the message has been pushed by the RDE server 40 to the next destination. However, if no send receipt was requested (or if the RDE server 40 has sent the send receipt), then the process branches to Step 710 to determine if any additional messages are in the document out queue table 320c.

Figure 8:
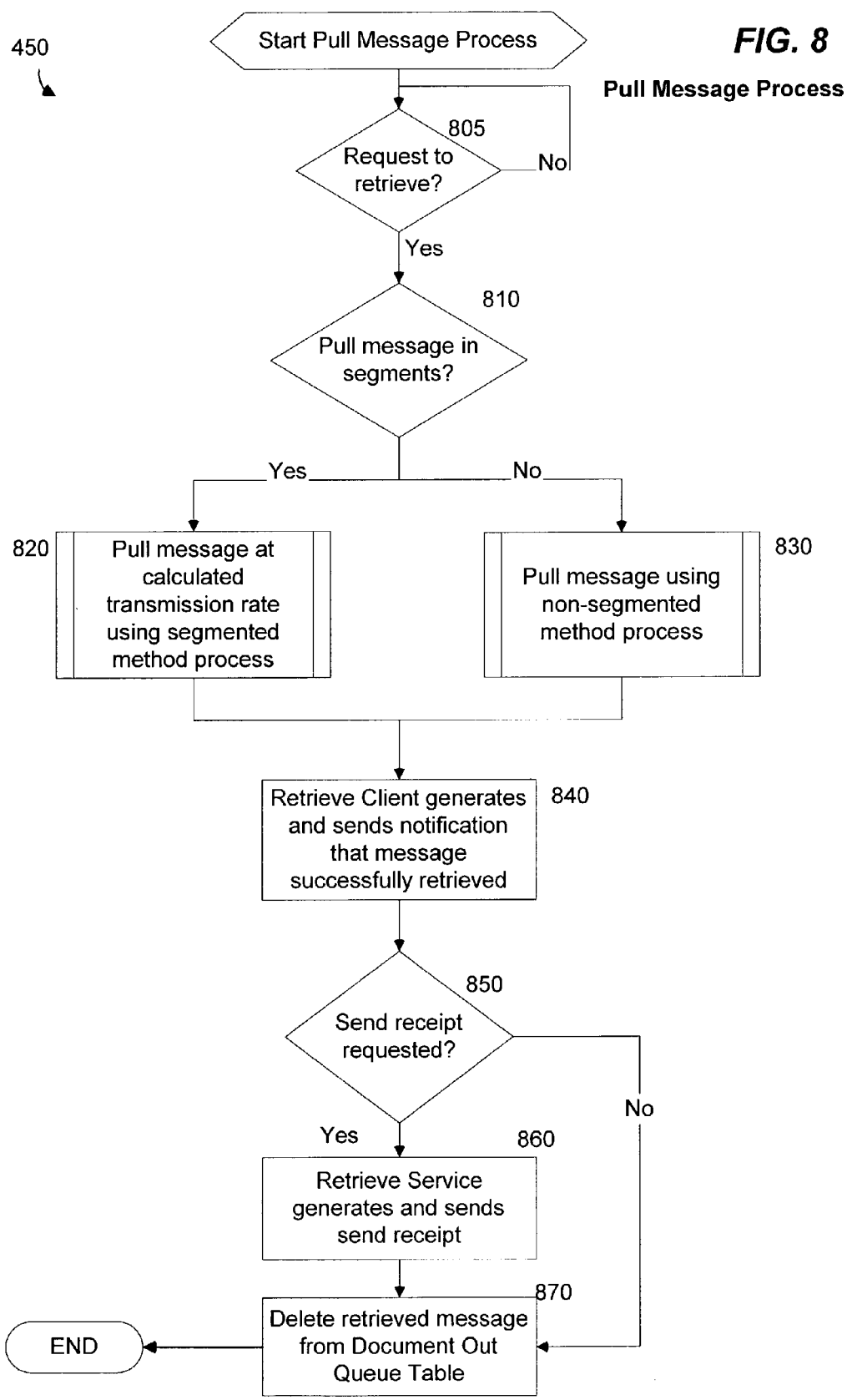
FIG. 8 is a logic flow diagram illustrating an exemplary sub-process or routine of FIG. 4 for retrieving a message via the computer network.

FIG. 8 is a logic flow diagram illustrating an exemplary sub-process or routine 450 of FIG. 4 for retrieving a message via the computer network 50. Step 805 is the first step in the exemplary sub-process 450. In Step 805, the retrieve service 260 determines whether it has received a request from a retrieve client 30 to retrieve (or "pull") a message. If the retrieve service 260 has received such a request, then in Step 810, the retrieve service 260 determines whether the retrieve client 30 wants to retrieve the message in segments or whether it wants to retrieve the entire message at one time. If the retrieve client 30 wants to retrieve the message in segments, then in Step 820, the retrieve service 260 retrieves and sends the message to the retrieve client 30 using the segmented method process and a transmission rate calculated by the retrieve client 30.

On the other hand, if in Step 810 the retrieve client 30 wants to pull the entire message, then in Step 830, the retrieve service 260 pulls and sends the message using the non-segmented method process.

In Step 840, the retrieve client 30 generates and sends notification to the RDE server 40 when it has successfully retrieved the entire message. If the retrieve client 30 has requested to retrieve a message in segments, then the retrieve client 30 generates the notification upon retrieving all of the segments of the multiplexed message.

In Step 850, the retrieve service 260 determines whether the send client 10 (who originally created and sent the message) has requested to receive a send receipt for the retrieved message. If a send receipt has been requested, then in Step 860, the retrieve service 260 generates and sends a send receipt to the original send client 10. However, if a send receipt has not been requested, or if in Step 860 the retrieve service 260 has generated and sent a send receipt, then in Step 870, the retrieve service 260 deletes the retrieved message from the document out queue table 320c.

Figure 9:
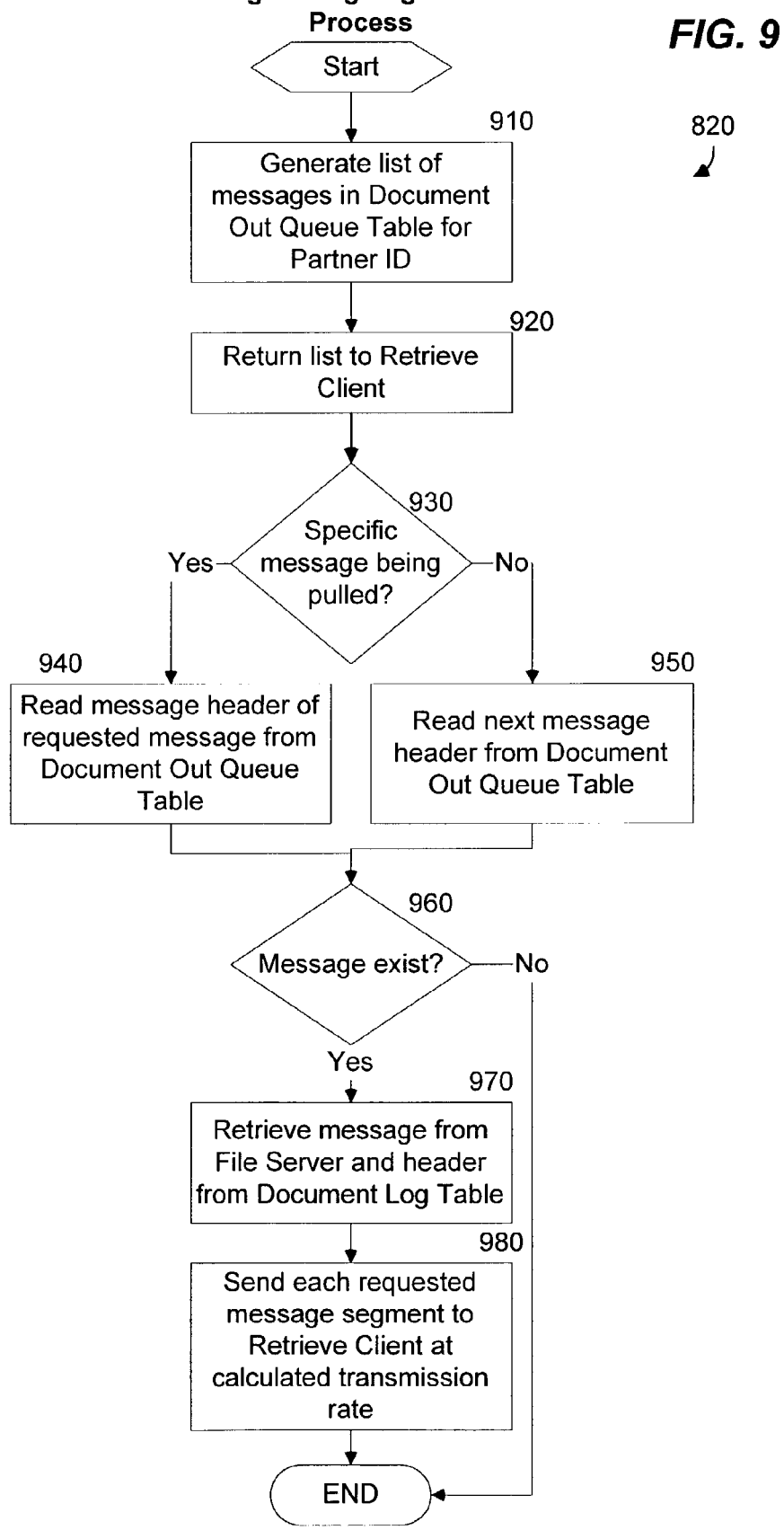
FIG. 9 is a logic flow diagram illustrating an exemplary sub-process or routine of FIG. 8 for pulling a message using the segmented method process.

FIG. 9 is a logic flow diagram illustrating an exemplary sub-process or routine 820 of FIG. 8 for pulling a message using the segmented method process. Step 910 is the first step in the exemplary process 820. In Step 910, the retrieve service 260 generates a list of messages in the document out queue table 320c that are to be sent to the retrieve client 30. In Step 920, the retrieve service 260 returns the list of messages that exist in the document out queue table 320c to the retrieve client 30.

In Step 930, the retrieve service 260 determines whether the retrieve client 30 wants to pull a specific message from the list of messages or simply the next message available to be retrieved from the document out queue table 320c. If the retrieve client 30 wants to pull a specific message, then in Step 940, the retrieve service 260 reads the message header of the specific message from the document out queue table 320c. However, in Step 930, if the retrieve client 30 wants to pull the next available message, then in Step 950, the retrieve service 260 reads the next message header for the next message from the document out queue table 320c. In Step 960, the retrieve service 260 confirms that the message requested to be pulled exists in the file server 220. If in Step 960, the retrieve service 260 determines that for some reason the message does not exist, then the process ends. However, if the message does exist, then in Step 970, the retrieve service 260 retrieves the message from the file server 220 and the header information from the document log table 220a. In Step 980, for each message segment requested to be retrieved by the retrieve client 30, the retrieve service 260 sends the message segment to the retrieve client 30 at a transmission rate calculated and provided by the retrieve client 30. The retrieve client 30 then retrieves each segment of the message at different times or in parallel, and in any order.

In another exemplary embodiment of the present invention, the retrieve client 30 retrieves any message originally sent to the retrieve client 30 directly from the document log table 320a or the document out queue table 320c. In yet another exemplary embodiment, rather than first receiving a list of messages available to be retrieved by the retrieve client 30 from the document log table 320a or the document out queue table 320c, as illustrated in Steps 910 and 920 of FIG. 9, the retrieve client 30 can simply retrieve the next message from either table 320a, 320c as illustrated in Step 950.

Figure 10:
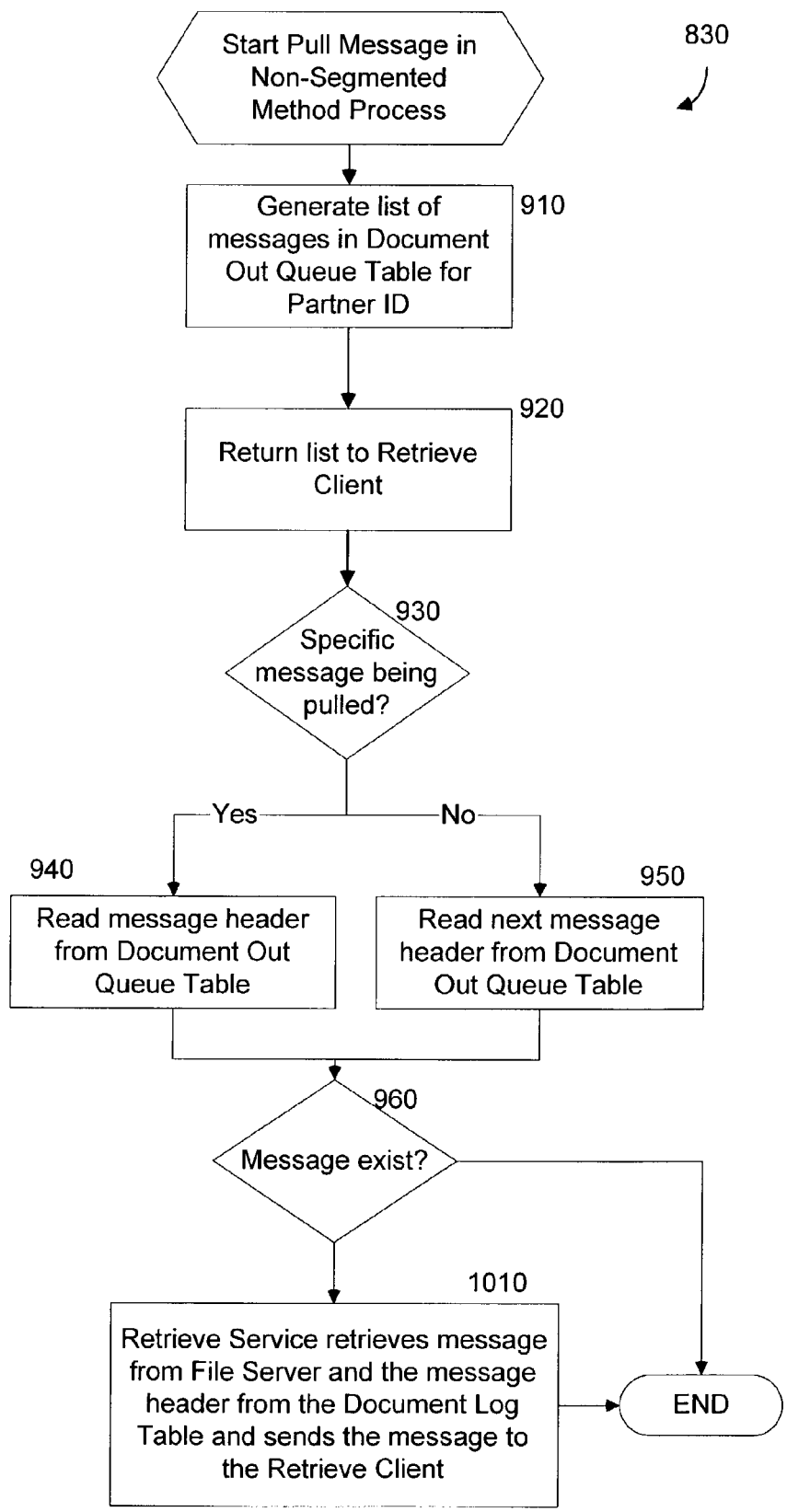
FIG. 10 is a logic flow diagram illustrating an exemplary sub-process or routine of FIG. 8 for pulling a message using a non-segmented method process.

FIG. 10 is a logic flow diagram illustrating an exemplary sub-process or routine 830 of FIG. 8 for pulling a message using a non-segmented method process. Step 910 is the first step in the exemplary process 830. In Step 910, the retrieve service 260 generates a list of messages that exist in the document out queue table 320c and that are to be sent to the retrieve client 30. In Step 920, the retrieve service 260 returns the list of messages that exist in the document out queue table 320c to the retrieve client 30.

In Step 930, the retrieve service 260 determines whether the retrieve client 30 wants to pull a specific message from the list of messages or simply the next message available to be retrieved from the document out queue table 320c. If the retrieve client 30 wants to pull a specific message, then in Step 940, the retrieve service 260 reads the message header of the requested message from the document out queue table 320c. However, in Step 930, if the retrieve client 30 wants to pull the next available message, then in Step 950, the retrieve service 260 reads the message header for the next message from the document out queue table 320c. In Step 960, the retrieve service 260 confirms that the message that the retrieve client 30 has requested to be pulled exists in the file server 220. If in Step 960, the retrieve service 260 determines that for some reason the message does not exist, then the process ends. However, if the message does exist, then in Step 1010, the retrieve service 260 retrieves the message from the file server 220 and the header information from the document log table 220a. The retrieve service 260 then sends the entire message to the retrieve client 30.

In another exemplary embodiment of the present invention, the retrieve client 30 retrieves any message originally sent to the retrieve client 30 directly from the document log table 320a or the document out queue table 320c. In yet another exemplary embodiment, rather than first receiving a list of messages available to be retrieved by the retrieve client 30 from the document log table 320a or the document out queue table 320c, as illustrated in Steps 910 and 920 of FIG. 10, the retrieve client 30 can simply retrieve the next message from either table 320a, 320c as illustrated in Step 950.

It should be understood that the foregoing relates only to illustrative embodiments of the present invention, and that numerous changes may be made therein without departing from the scope and spirit of the invention as defined by the following claims.

What is claimed is:

1. A system for electronically exchanging a message comprising a plurality of message segments via a computer network between a first computer operative to send message segments over the computer network and a second computer operative to receive the message segments over the computer network, the system comprising:

a data exchange server, functionally coupled to the computer network, operative to manage each message exchanged by the first computer and the second computer via the computer network the data exchange server, comprising:

a storage device, operative to store the message segments of each message exchanged via the computer network;

a send service, operative to receive the message segments sent by the first computer via the computer network and to store the message segments in the Storage device; and a reader service, for each message segment received by the send service and to be sent to the second computer, evaluating current network throughput based upon the amount of time taken to send a previous message segment, calculating, at a reader service, a transmission rate at which to send the message segment based upon the current network throughput, wherein calculating comprises:

selecting a weight factor, wherein the weight factor controls how quickly the calculated transmission rate, calculated by the reader service, reacts to a change in the network throughput;

selecting a target transmission rate at which to desirably send the message segment to the receive client;

calculating an actual transmission rate at which the previous message segment was sent to the receive client;

multiplying the weight factor by a difference between the actual transmission rate and the target transmission rate to arrive at a weighted result;

adding the target transmission rate to the weighted result; and pushing the message segment at the calculated transmission rate to the receive client.

2. The system for electronically exchanging a message of claim 1, the data exchange server further comprising a process service, operative to determine whether the message should be translated into a requested format prior to sending the message segments of the message to the second computer.

3. The system for electronically exchanging a message of claim 2, the data exchange server further comprising a user assembly, responsive to a request from the process service to translate the message into the requested format, operative to translate the message into the requested format.

4. The system for electronically exchanging messages of claim 3, wherein the user assembly, responsive to a request from the process service to process the message, is operative to process the message.

5. The system for electronically exchanging a message of claim 1, the data exchange server further comprising a retrieve service, operative to send each message segment at a transmission rate provided by the second computer in response to a request from the second computer to retrieve the message segments of the message.

6. A method for sending a message comprising at least one message segment, the method comprising the steps of:

for each message segment to be sent to a next destination evaluating current network throughput based upon the amount of time taken to send a previous message segment, calculating, at a reader service, a transmission rate at which to send the message segment based upon the current network throughput, wherein calculating comprises:

selecting a weight factor, wherein the weight factor controls how quickly the calculated transmission rate, calculated by the reader service, reacts to a change in the network throughput;

selecting a target transmission rate at which to desirably send the message segment to the receive client;

calculating an actual transmission rate at which the previous message segment was sent to the receive client;

multiplying the weight factor by a difference between the actual transmission rate and the target transmission rate to arrive at a weighted result;

adding the target transmission rate to the weighted result; and pushing the message segment at the calculated transmission rate to the receive client.

7. The method for sending the message of claim 6, comprising the step of issuing a send receipt, in response to a request for the send receipt, if all the message segments of the message have been sent to the next destination.

8. The method for sending the message of claim 6, the sending step comprising the steps of:

determining whether the message to be sent has expired; and if the message has not expired, sending each message segment of the message to the next destination at the calculated transmission rate.

9. A system for managing a message received via a computer network, the message comprising a plurality of message segments, the system comprising:

a storage device, operative to store the message received via the computer network;

a send service, functionally coupled to the storage device, operative to receive the message segments, to determine whether all the message segments of the message have been received and, responsive to receiving all the message segments of the message, to store the message in the storage device; and a retrieve service, functionally coupled to the storage device, responsive to a request to retrieve the message at a calculated transmission rate, the calculated transmission rate being based on an actual transmission rate and a target transmission rate, the target transmission rate being selected by the retrieve service, wherein the calculated transmission rate comprises:

selecting a weight factor, wherein the weight factor controls how quickly the calculated transmission rate, calculated by the reader service, reacts to a change in the network throughput;

selecting a target transmission rate at which to desirably send the message segment to the receive client;

calculating an actual transmission rate at which the previous message segment was sent to the receive client;

multiplying the weight factor by a difference between the actual transmission rate and the target transmission rate to arrive at a weighted result;

adding the target transmission rate to the weighted result; and the retrieve service being operative to retrieve the message from the storage device and to push each message segment of the message at the calculated transmission rate to an entity issuing the request.

10. A method for using a data exchange server to manage the electronic exchange of a message between a send client and a receive client, wherein the message comprises at least one message segment, the method comprising the steps of:

receiving each message segment sent by the send client at the data exchange server;

determining if all the message segments of the message have been received by the data exchange server based on a message size specified by the send client and a size of each message segment; and if all the message segments have been received at the data exchange server, for each message segment to be sent to the receive client, evaluating current network throughput based upon the amount of time taken to send a previous message segment, calculating, at a reader service, a transmission rate at which to send the message segment based upon the current network throughput, wherein calculating comprises:

selecting a weight factor, wherein the weight factor controls how quickly the calculated transmission rate, calculated by the reader service, reacts to a change in the network throughput;

selecting a target transmission rate at which to desirably send the message segment to the receive client;

calculating an actual transmission rate at which the previous message segment was sent to the receive client;

multiplying the weight factor by a difference between the actual transmission rate and the target transmission rate to arrive at a weighted result;

adding the target transmission rate to the weighted result; and pushing the message segment at the calculated transmission rate to the receive client.

11. The method of using a data exchange server of claim 10, comprising the steps of:

issuing a request to the data exchange server to retrieve each message segment of the message; and for each message segment of the message, calculating a transmission rate based upon network throughput, and retrieving the message segment from the data exchange server at the calculated transmission rate.

12. A method for using a data exchange server to manage the electronic exchange of a message between a send client and a receive client, wherein the message comprises at least one message segment, the method comprising the steps of:

receiving each message segment sent by the send client at the data exchange server;

determining whether the data exchange server has received all the message segments of the message;

if all the message segments of the message have been received by the data exchange server, storing the message in the storage device; and for each message segment to be sent to a next destination, evaluating current network throughput based upon the amount of time taken to send a previous message segment, calculating, at a reader service, a transmission rate at which to send the message segment based upon the current network throughput, wherein calculating comprises:

selecting a weight factor, wherein the weight factor controls how quickly the transmission rate calculated by the reader service reacts to a change in the current network throughput;

selecting a target transmission rate at which to preferably send the message segment to the next destination;

calculating an actual transmission rate at which the previous message segment was sent to the next destination;

multiplying the weight factor by a difference between the actual transmission rate and the target transmission rate to arrive at a weighted result;

adding the target transmission rate to the weighted result; and pushing the message segment of the message received from the send client at the data exchange server to the next destination at the calculated transmission rate.

13. A method for sending a message comprising at least one message segment to a next destination, the method comprising the steps of:

for each message segment to be sent to the next destination, calculating a transmission rate for the message segment based upon current network throughput, determining whether the message segment is to be translated into a requested format and, if so, translating the message segment into the requested format; and pushing the message segment at the calculated transmission rate, in the requested format, to the next destination;

wherein the calculating step comprises evaluating the current network throughput based upon an amount of time taken to send a previous message segment;

wherein the calculating step comprises the steps of:

defining a weight factor, wherein the weight factor controls how quickly to react to a change in the network throughput;

defining a target transmission rate at which to preferably send the message segment to the receive client;

defining an actual transmission rate at which the previous message segment was sent to the receive client;

multiplying the weight factor by the difference between the actual transmission rate and the target transmission rate to arrive at a weighted result; and adding the target transmission rate to the weighted result.

* * * * *